(No Model.)
T. L. MARVEL.
ROPE COUPLING.
No. 580,214. Patented Apr. 6, 1897.
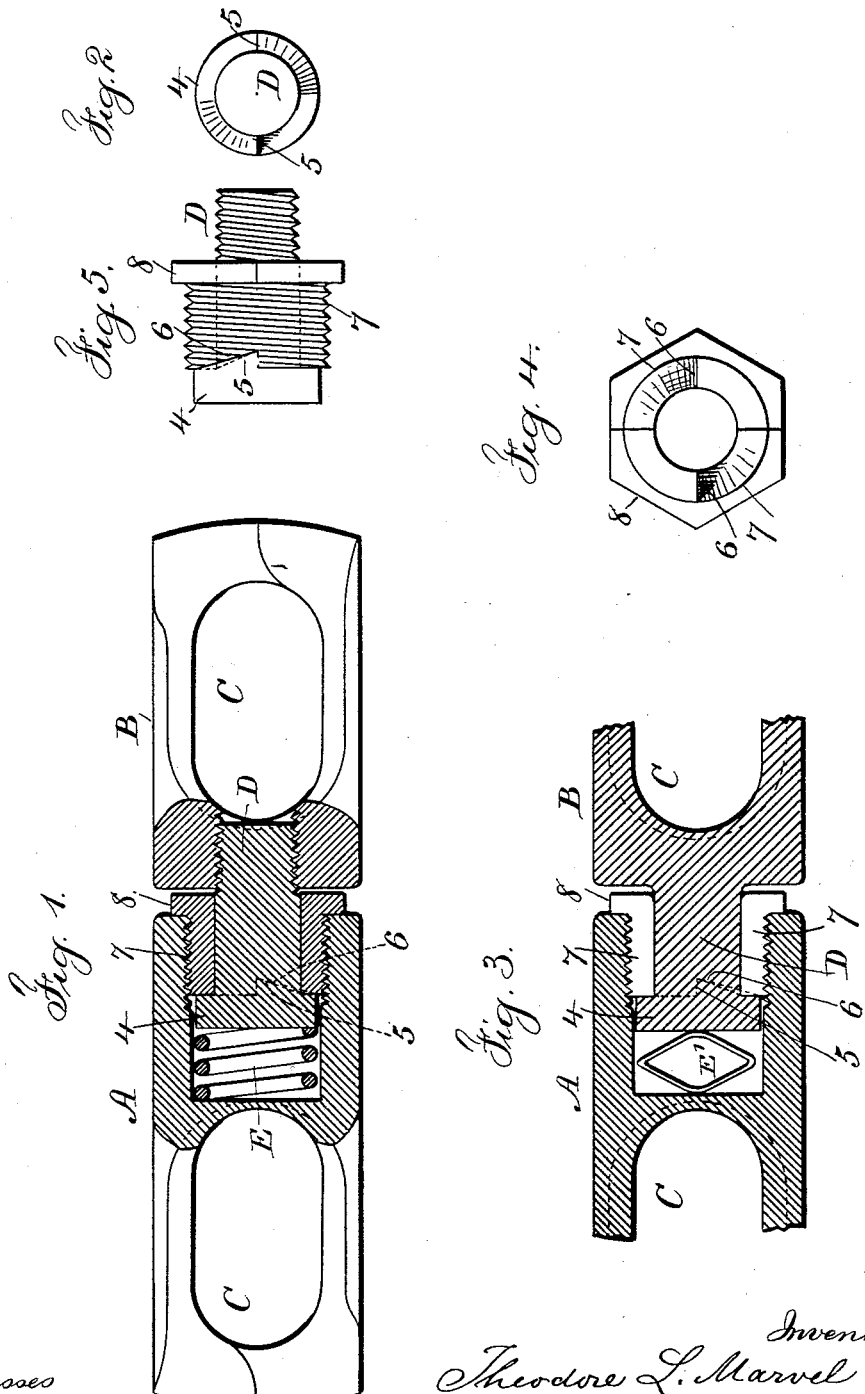
Witnesses
Chas H Smith
J. Staib
Inventor
Theodore L. Marvel
per L. W. Serrell & Son
Attys

UNITED STATES PATENT OFFICE.

THEODORE L. MARVEL, OF TAUNTON, MASSACHUSETTS.

ROPE-COUPLING.

SPECIFICATION forming part of Letters Patent No. 580,214, dated April 6, 1897.

Application filed May 22, 1896. Serial No. 592,588. (No model.)

*To all whom it may concern:*

Be it known that I, THEODORE L. MARVEL, a citizen of the United States, residing at Taunton, in the county of Bristol and State of Massachusetts, have invented an Improvement in Rope-Couplings, of which the following is a specification.

Couplings for ropes, especially for Manila and hemp ropes, have been made with eyes through which the strands of the rope are passed and turned back and interlaced similar to splicing, and these metallic coupling devices have been connected by a central bolt having peripheral projections similar to ratchet-teeth and a pawl that can be moved laterally for engaging the ratchet-teeth, and it is usual after the rope has been connected at its ends to the parts of the coupling to rotate one part of the coupling to wind up the rope in the direction of the twist and thereby tighten the same, and this tightening operation can be performed from time to time as the rope may become slack under tension.

In practice it has been found that rope-couplings constructed as aforesaid are not always reliable in operation, because the laterally-moving pawl may, by concussion or otherwise, drop laterally from its engagement with the ratchet-teeth, and one part of the coupling will rotate in relation to the other part of the coupling and allow the rope to untwist and consequently slacken.

The object of the present invention is to insure the proper engagement of the holding-teeth by the strain or tension upon the rope and at the same time to tighten up the screw-threaded portions of the coupling by the tendency of the rope to untwist, thus effectually preventing the parts separating or the twist of the rope uncoiling. Hence the more tension and the greater the twist the firmer the coupling will hold.

In carrying out my invention I provide two portions to the coupling, that are to be connected to the ends of the rope in any usual manner. If the rope is a wire rope, the ends may be introduced into any suitable ferrules. If the rope is hemp or manila, the strands may be passed through any suitable eyes and laid back and intertwined with the rope similar to splicing, and upon one portion of the coupling is a stem with a head passing into the other portion of the coupling, such head having interlocking projections or teeth upon the surfaces, upon which the tension of the rope is supported, the inclination of the interlocking teeth being such that the tendency of the rope to untwist causes the interlocking portions to firmly engage each other, and hence the interlock is secured by the joint action of tension and the tendency to untwist, and as the twist may be increased from time to time to take up any slack it is only necessary to turn one part of the coupling in its relation to the other part of the coupling, and the interlocking projections or teeth engage each other successively and prevent the rope untwisting, and the tendency of the rope to untwist tightens the screws made use of.

In the drawings, Figure 1 is a partial section longitudinally of the rope-coupling. Fig. 2 is an end view of the stem and interlocks. Fig. 3 is a section similar to Fig. 1, showing a slight modification. Fig. 4 is an end view of the tubular thimble, and Fig. 5 is an elevation of the thimble and stem detached.

The parts A and B of the coupling are adapted to be permanently connected with the ends of the rope. I have shown eyes C, through which the strands of the Manila or hemp rope may be passed, but these couplings A and B may be constructed in any desired manner for the ends of the rope to be connected with them.

The stem D is upon one portion of the coupling, and it extends through into a cylindrical recess in the other portion of the coupling, and this stem is provided with a head 4 and interlocks 5, and these interlocks engage similar interlocks 6 upon the portion of the coupling through which the stem D passes. These interlocks 5 and 6 are advantageously in the form of hook-shaped teeth, with their edges radial and at opposite sides of the stem, and it is advantageous to make the interlocks 6 in the surface of a tubular thimble 7, which is screwed into the cylindrical recess in the portion A of the coupling. There may be any desired number of interlocking teeth.

The screw-thread on the exterior of this tubular thimble 7 is advantageously inclined in such a direction that it is screwed into place by the interlocks, or in the direction in which they engage each other, so that the thimble cannot be unscrewed by turning the interlocks back, because such interlocks slide one upon the other, and the pressure against the interlocks in holding the rope in a twisted condition tends to screw the tubular thimble firmly into its position, and it is advantageous to provide a flange 8 at the projecting end of this tubular thimble that is adapted to receive a key or wrench for unscrewing the thimble and separating the parts. This flange also forms a stop to prevent the thimble being screwed up too far.

In some kinds of rope-clamps the stem D can be made integral with the portion B of the coupling, and in this case the tubular thimble 7 will be in two parts set together at opposite sides of the stem and screwed into the socket of the coupling A; but in other instances the stem D may be made separate from the portion B of the coupling, in which instance such stem is to be screw-threaded and screwed into an opening in the portion B of the coupling, and the direction of inclination of the screw-thread upon this stem D is to be such that the pressure against the interlocks 6 will tend to screw such stem more firmly into the coupling, and the parts can be separated by grasping the head 4 and holding the same while the coupling B is unscrewed from the stem, and it is usually preferable to place the stem through the tubular thimble 7 and screw the stem into the coupling B before the thimble 7 is screwed into the recess or socket of the coupling A.

Under almost all conditions the weight of the rope or the tension upon the same will hold the interlocks 5 and 6 firmly together, but to guard against the possibility of the interlocks being relieved, so as to allow one part of the coupling to be rotated in relation to the other part of the coupling, a spring may be employed to press the parts of the interlocks together. I have shown a spring X, that acts to press the head 4 toward the tubular thimble 7. This spring may be of any desired character. I have, however, shown the spring as made of a wire helix E in Fig. 1 and as an elliptical spring E' in Fig. 3.

I claim as my invention—

1. The combination with the parts of the coupling that are secured to the ends of the rope, of a stem extending out from one part of the coupling, there being a head upon the stem and ratchet-teeth upon such head and a thimble screwed into the other portion of the coupling and having teeth with which such head comes into contact and a polygonal flange on the outer end of the thimble for the reception of a wrench, substantially as set forth.

2. The combination with the parts of the coupling that are secured to the ends of the rope, of a stem extending out from one part of the coupling and passing into the other part of the coupling, there being a head upon the stem and interlocking projections upon such head and upon the surface of the coupling with which such head comes into contact whereby the interlocking projections are held together by the tension upon the rope, and a thimble screwed into one part of the coupling with one end engaging the interlocks upon the head, the direction of the screw-thread being such that the twisted rope acting through the interlocks tends to screw the thimble firmly into place, substantially as set forth.

3. The combination with the parts of the coupling that are secured to the ends of the rope, of a stem extending out from one part of the coupling and passing into the other part of the coupling, there being a head upon the stem and interlocking projections upon such head and upon the surface of the coupling with which such head comes into contact whereby the interlocking projections are held together by the tension upon the rope, and a thimble screwed into one part of the coupling with one end engaging the interlocks upon the head, the direction of the screw-thread being such that the twisted rope acting through the interlocks tends to screw the thimble firmly into place, and there being a flange upon the tubular thimble, substantially as set forth.

4. The combination with the two parts in a rope-coupling, of a stem screwed into one part and having a head with interlocks engaging similar interlocks within the other part of the coupling, the direction of the screw-thread being such that the twist of the rope acting through the interlocks tends to screw the stem firmly into position, substantially as set forth.

5. The combination with the two parts in a rope-coupling, of a stem screwed into one part and having a head with interlocks engaging similar interlocks within the other part of the coupling, the direction of the screw-thread being such that the twist of the rope acting through the interlocks tends to screw the stem firmly into position, and a screw-thimble having at its end the interlocks that engage the interlocks upon the head, the direction of the screw-thread being such that the twist of the rope acting through the interlocks tends to screw the thimble firmly into the one portion of the coupling, substantially as set forth.

Signed by me this 19th day of May, 1896.

THEODORE L. MARVEL.

Witnesses:
GEO. T. PINCKNEY,
S. T. HAVILAND.